(12) United States Patent
Kang et al.

(10) Patent No.: US 10,686,173 B2
(45) Date of Patent: Jun. 16, 2020

(54) BATTERY PACK COMPRISING FIRE EXTINGUISHING AGENT

(71) Applicant: LG Chem, Ltd., Daejeon (KR)

(72) Inventors: Ik Su Kang, Daejeon (KR); Jung Koo Kang, Daejeon (KR); Sang Uck Kim, Daejeon (KR); Han Sol Park, Daejeon (KR); Byung Hun Oh, Daejeon (KR)

(73) Assignee: LG Chem, Ltd. (KR)

( * ) Notice: Subject to any disclaimer, the term of this patent is extended or adjusted under 35 U.S.C. 154(b) by 266 days.

(21) Appl. No.: 15/799,244

(22) Filed: Oct. 31, 2017

(65) Prior Publication Data

US 2018/0123103 A1    May 3, 2018

(30) Foreign Application Priority Data

Oct. 31, 2016 (KR) .................. 10-2016-0143503

(51) Int. Cl.
*H01M 2/12* (2006.01)
*H01M 2/10* (2006.01)
*H01M 2/02* (2006.01)

(52) U.S. Cl.
CPC .......... *H01M 2/12* (2013.01); *H01M 2/0202* (2013.01); *H01M 2/1022* (2013.01); *H01M 2/1282* (2013.01); *H01M 2/022* (2013.01); *H01M 2200/00* (2013.01); *H01M 2220/30* (2013.01)

(58) Field of Classification Search
CPC .............................. H01M 2/1282; H01M 2/02
See application file for complete search history.

(56) References Cited

U.S. PATENT DOCUMENTS

| 7,488,546 | B2 | 2/2009 | Kim et al. |
| 8,318,333 | B2 | 11/2012 | Yamamoto et al. |
| 10,035,032 | B2* | 7/2018 | Li .................. B60L 3/0046 |
| 2007/0164711 | A1* | 7/2007 | Kim .................. H01M 10/4207 |
| | | | 320/149 |
| 2009/0098443 | A1 | 4/2009 | Yamamoto et al. |
| 2009/0176148 | A1* | 7/2009 | Jiang .................. H01M 6/5038 |
| | | | 429/120 |

(Continued)

FOREIGN PATENT DOCUMENTS

JP          2014-160573 A    9/2014
KR    10-2007-0071237 A    7/2007

(Continued)

*Primary Examiner* — Matthew J Merkling
(74) *Attorney, Agent, or Firm* — Lerner, David, Littenberg, Krumholz & Mentlik, LLP

(57) ABSTRACT

A battery pack includes an electrode assembly having a cathode, an anode, and a separator interposed therebetween, a first pack case having the electrode assembly and an electrolyte disposed therein, a second pack case with the first pack case disposed therein and a portion of the interior surface separated from the first pack case exterior surface, a fire extinguishing agent disposed between the exterior surface of the first pack case and the interior surface of the second pack case and a cap assembly that simultaneously seals an open surface of the first and second pack cases when the first pack case is disposed in the second pack case. A first venting portion is configured to open to enable the fire extinguishing agent to flow into the interior of the first pack case when the pressure within the first pack case is equal to or greater than a critical pressure.

17 Claims, 5 Drawing Sheets

(56) References Cited

U.S. PATENT DOCUMENTS

| | | | | |
|---|---|---|---|---|
| 2012/0048577 | A1* | 3/2012 | Ball | A62C 3/00 169/46 |
| 2013/0209852 | A1* | 8/2013 | Schletterer | A62C 3/16 429/99 |
| 2013/0264073 | A1* | 10/2013 | Ling | A62C 3/07 169/46 |
| 2014/0060859 | A1* | 3/2014 | Kountz | H01M 2/1094 169/46 |
| 2015/0056482 | A1* | 2/2015 | Kyla-Kaila | A62C 3/07 429/61 |
| 2016/0043368 | A1* | 2/2016 | Kim | H01M 2/1241 429/56 |
| 2019/0168038 | A1* | 6/2019 | Lian | A62C 3/16 |
| 2019/0319234 | A1* | 10/2019 | Cordani | A62C 3/16 |
| 2019/0334143 | A1* | 10/2019 | Sugeno | H01M 2/10 |

FOREIGN PATENT DOCUMENTS

| | | |
|---|---|---|
| KR | 10-2007-0073173 A | 7/2007 |
| KR | 2009-0038382 A | 4/2009 |
| KR | 10-1335372 B1 | 12/2013 |
| KR | 2016-0019251 A | 2/2016 |

* cited by examiner

BATTERY PACK COMPRISING FIRE EXTINGUISHING AGENT

CROSS-REFERENCE TO RELATED APPLICATION

This application claims priority to and the benefit of Korean Patent Application No. 2016-0143503, filed on Oct. 31, 2016, the disclosure of which is incorporated herein by reference in its entirety.

TECHNICAL FIELD

The present disclosure relates to a battery pack, and more particularly, to a battery pack including a fire extinguishing agent.

RELATED ART

Recently, energy prices have increased due to the depletion of fossil fuels and interest in environmental pollution has increased. Accordingly, the demand for environmentally-friendly alternative energy sources has increased. Thus, research into techniques for generating various power sources, through nuclear energy, solar energy, wind power, and tidal power have been conducted and power storage apparatuses for more efficient use of the generated energy has been conducted. In particular, the demand for secondary batteries as energy sources has rapidly increased as mobile device technology developed and increases. Accordingly, significant research on batteries that meet various functional requirements has been conducted.

Typically, regarding the shape of the battery, there is an increased demand for prismatic secondary batteries and pouch-shaped secondary batteries which have a reduced thickness and are used in products such as mobile phones. In particular, the material of the battery requires an increased demand for lithium secondary batteries, (e.g., lithium ion batteries and lithium ion polymer batteries) which have advantages that include increased energy density, increased discharge voltage and improved output stability.

In addition, secondary batteries are classified based the structure of an electrode assembly with a structure that includes a cathode and an anode stacked with a separator is interposed between the cathode and the anode. For example, the electrode assembly includes a structure having layered spiral arrangement (e.g., a jelly-roll (wound) type structure) in which long sheet type cathodes and long sheet type anodes are wound with separators disposed respectively between the cathodes and the anodes or a stacked type structure having pluralities of cathodes and anodes each having a predetermined size sequentially stacked when separators are disposed respectively between the cathodes and the anodes.

Recently, to solve problems caused by the layered spiral arrangement assembly and the stacked type electrode assembly a stacked/folded type electrode assembly has been developed. The stacked/folded type electrode assembly is a combination of the layered spiral arrangement assembly and the stacked type electrode assembly and has an improved structure in which predetermined numbers of cathodes and anodes are sequentially stacked when separators are disposed respectively between the cathodes and the anodes to constitute a unit cell and then a plurality of the unit cells are sequentially wound while being placed on a separation film.

Secondary batteries are classified based on the shape of the battery case. For example, a cylindrical battery has a structure with an electrode assembly mounted in a cylindrical metal container. A prismatic battery includes a structure having an electrode assembly mounted in a prismatic metal container. A pouch-shaped battery includes a structure having an electrode assembly mounted in a pouch-shaped case formed from an aluminum laminate sheet. Secondary batteries are exposed to various environments according to the operation state and conditions. Accordingly, it is necessary to prevent, explosion of secondary batteries to ensure user safety. More specifically, secondary batteries having high temperature and high pressure caused by an abnormal operation state (e.g., an internal short circuit, charging exceeding allowable current and voltage, exposure to high temperature, impact due to falling) that may cause combustion of the battery.

In particular, even though the shapes of the batteries are different from one another, each of the batteries include a high pressure release capable of relieving a high pressure of the battery that directly causes a battery explosion. For example, a cylindrical battery includes a safety vent of a specific structure, mounted in a cap assembly. A prismatic battery has a safety vent formed on a cap or a case of the battery. A pouch-shaped battery includes the seam of the laminate sheet separated without a separate safety vent. In other words, in most of the secondary batteries when a high temperature and a high pressure are generated due to an abnormal operation state, a safety vent or a seam formed in the case or the cap portion opens, thereby reducing the internal pressure and temperature and eliminating the safety problems.

However, recently, the capacity of secondary batteries has increased. Additionally, in order to maximize the capacity in a limited space, a secondary battery with increased energy density has been developed. Accordingly, when the safety vent or the seam opens, the venting technique may not be sufficient to reduce the pressure or temperature within the secondary battery, which results in the maintenance of a high temperature and a high pressure within the interior of the secondary battery. Accordingly, even though the safety vent or the seam opens the safety of the secondary battery cannot be secured sufficiently. Thus, there is a significant need for a technology capable of fundamentally solving the problem.

The above information disclosed in this section is merely for enhancement of understanding of the background of the disclosure and therefore it may contain information that does not form the prior art that is already known in this country to a person of ordinary skill in the art.

SUMMARY

The present disclosure provides a batter pack having a fire extinguishing agent. In an aspect of an exemplary embodiment of the present disclosure, a battery pack may include an electrode assembly having a cathode, an anode, and a separator interposed therebetween, a first pack case with the electrode assembly and an electrolyte disposed therein, a second pack case for with the first pack case disposed therein having a portion of an interior surface of the second pack case spaced apart from an exterior surface of the first pack case, a fire extinguishing agent disposed in a cavity between the exterior surface of the first pack case and the interior surface of the second pack case and a cap assembly coupled to simultaneously seal an open surface of the first pack case and of the second pack case when the first pack case containing the electrode assembly and the electrolyte and the fire extinguishing agent are contained and disposed in the second pack case. A first venting portion, may be configured to open to enable the fire extinguishing agent disposed in the cavity to flow into the interior of the first pack case when the pressure within the first pack case is equal to or greater than a critical pressure, is formed on the exterior surface of the first pack case in the cavity between the exterior surface of the first pack case and the interior surface of the second pack case.

In some exemplary embodiments, the fire extinguishing agent may be a liquid perfluoroketone which vaporizes at a fixed temperature. In other exemplary embodiments, the volume of the cavity between the exterior surface of the first pack case and the interior surface of the second pack case may be about 0.1% to about 10% of the volume of the second pack case. In other exemplary embodiments, the first venting portion may be configured to open when the temperature of the battery pack is equal to or greater than a range of about 80 to 100 degrees Celsius.

Additionally, in some exemplary embodiments, the cap assembly may include a second venting portion that is configured to open to discharge the gas disposed within the first pack case when the pressure within the first pack case is equal to or greater than a critical pressure. In other exemplary embodiments, the second venting portion may be isolated from the cavity between the exterior surface of the first pack case and the interior surface of the second pack case.

In some exemplary embodiments, the battery pack may include the first pack case spaced apart from the interior surface of the second pack case at the exterior surface portion thereof excluding one surface coupled to the cap assembly. The battery pack may include the first pack case spaced apart from the interior surface of the second pack case, at the exterior surface portion thereof opposite to one surface coupled to the cap assembly. The battery pack may include the first venting portion having a slit structure formed on an exterior surface portion of the first pack case. The battery pack may include the slit structure with a discontinuous curve structure.

In other exemplary embodiments, battery pack may include the first pack case and the second pack case formed from a metal in a cylindrical shape. The battery pack may include the first pack case and the second pack case with the same or different shapes from each other. The battery pack may include the first pack case and the second pack case each having a cylindrical shape or a hexahedral shape.

In another aspect, a battery pack case for accommodating an electrode assembly having a cathode, an anode and a separator interposed therebetween, may include a first pack case with the electrode assembly and an electrolyte disposed therein, a second pack case having the first pack case with at least a portion of the interior surface thereof spaced apart from the exterior surface of the first pack case to dispose a fire extinguishing agent in a cavity between the first pack case and the second pack case and a cap assembly coupled that simultaneously seals one open surface of the first pack case and of the second pack case when the first pack case containing the electrode assembly and the electrolyte and the fire extinguishing agent are contained and filled in the second pack case. A first venting portion, may be configured to open to enable the fire extinguishing agent disposed in the cavity to flow into the interior of the first pack case when the pressure within the first pack case is equal to or greater than a critical pressure, is formed on the exterior surface of the first pack case in the cavity between the exterior surface of the first pack case and the interior surface of the second pack case.

In some exemplary embodiments, the fire extinguishing agent may be a liquid perfluoroketone which vaporizes at a fixed temperature. The battery pack case may include the volume of the cavity between the exterior surface of the first pack case and the interior surface of the second pack case of about 0.1% to about 10% of the volume of the second pack case. In other exemplary embodiments, the battery pack case may include the first venting portion configured to open when the temperature of the battery pack is equal to or greater than a range of about 80 to 100 degrees Celsius.

BRIEF DESCRIPTION OF THE DRAWINGS

Exemplary embodiments can be understood in more detail from the following description taken in conjunction with the accompanying drawings, in which.

DETAILED DESCRIPTION

Figure 1:
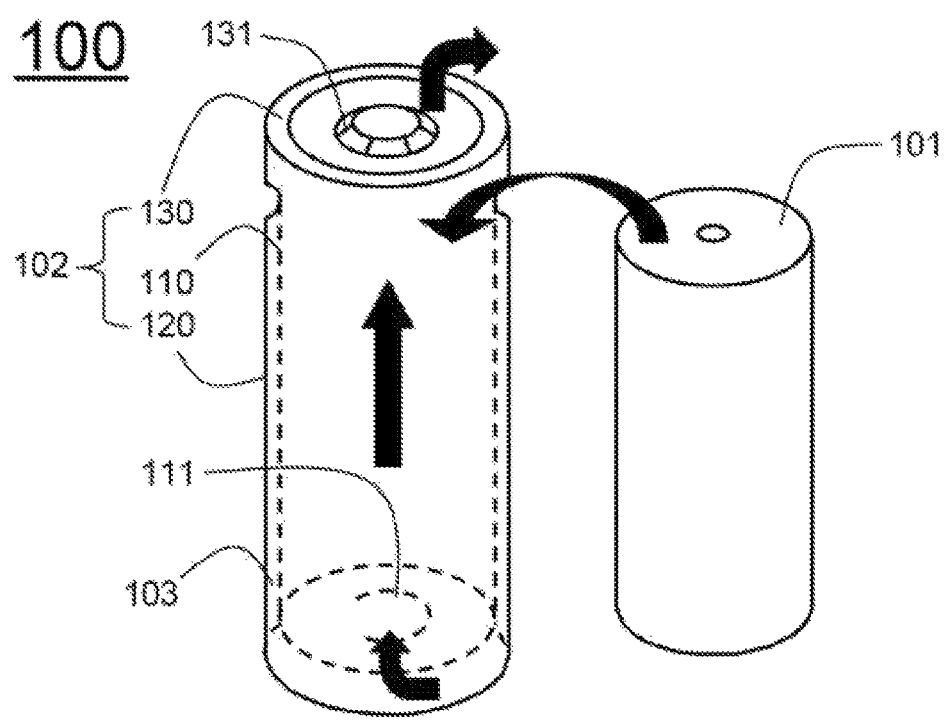
FIG. 1 is an exemplary schematic view showing the structure of a battery pack according to an exemplary embodiment of the present disclosure.

Hereinafter, embodiments of the present disclosure will be described with reference to the accompanying drawings. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In particular, in some exemplary embodiments, a battery pack may be configured such that, when the pressure within the interior of the first pack case is equal to or greater than a critical pressure, a first venting portion formed in the first pack case may be configured to open to allow a fire extinguishing agent disposed in a cavity between the exterior surface of the first pack case and the interior surface of the second pack case to flow into the interior of the first pack case. Accordingly, the fire extinguishing agent may directly contact an electrode assembly within the interior of the battery to reduce the temperature of the battery pack and the risk of ignition or explosion due to an increase in the internal temperature and pressure occurring under an abnormal operation state of the battery pack, may be reduced thereby enhancing the safety. Additionally, the battery pack may provide superior safety when compared to conventional battery packs that use a safety vent to reduce the internal temperature and pressure.

In order to achieve the object of the present disclosure, the battery pack according to the present disclosure may include an electrode assembly having a cathode, an anode and a separator interposed therebetween, a first pack case with the electrode assembly and an electrolyte disposed therein, a second pack case having the first pack case disposed therein and at least a portion of the interior surface of the second pack case is spaced apart from the exterior surface of the first pack case, a fire extinguishing agent may be disposed in the cavity between the exterior surface of the first pack case and the interior surface of the second pack case and a cap assembly may be coupled to simultaneously seal one open surface of the first pack case and of the second pack case when the first pack case containing the electrode assembly and the electrolyte and the fire extinguishing agent are contained and disposed within the second pack case. Additionally, a first venting portion, may be configured to open to allow the fire extinguishing agent disposed in the cavity to flow into the interior of the first pack case when the pressure within the interior of the first pack case is equal to or greater than a critical pressure, is formed on the exterior surface of the first pack case in the cavity between the exterior surface of the first pack case and the interior surface of the second pack case.

Accordingly, the temperature of the battery pack may be reduced by the direct contact between the fire extinguishing agent introduced into the interior and the electrode assembly within the battery. The risk of ignition or explosion due to an increase in the internal temperature and pressure occurring under an abnormal operation state of the battery pack may be reduced thereby enhancing the safety. Additionally, the battery pack may provide superior safety when compared to conventional battery packs that use a safety vent to reduce the internal temperature and pressure.

In an exemplary embodiment, the fire extinguishing agent may be a liquid perfluoroketone which vaporizes at a fixed temperature. Generally, the liquid perfluoroketone may have a boiling point of about 49 degrees Celsius and may be provided in the form of a colorless and odorless liquid at room temperature. Further, the liquid perfluoroketone may be harmless to the environment. Since liquid perfluoroketone may be chemically stable and may not react with other substances. Additionally, since liquid perfluoroketone may have a dielectric strength greater than twice that of nitrogen, liquid perfluoroketone and may not conduct a current. Further, since liquid perfluoroketone may have a very low viscosity and may not form droplets upon contact with other substances, and therefore spreads or diffuses rapidly.

In addition, the liquid perfluoroketone may have a viscosity very similar to water and rapidly evaporates when it comes into contact with fire and smoke at a fire site and may be provide both a refrigerant for cooling and a fire extinguishing agent. Thus, the perfluoroketone may be present in a liquid state in the cavity between the first pack case and the second pack case at approximately a room temperature. When the temperature increases due to an abnormal operation of the secondary battery, it vaporizes due to the heat. When the pressure within the interior of the first pack case is greater than a critical pressure, it flows more rapidly into the first pack case through the open first venting portion of the first pack case and may enable a reduction in the temperature and pressure in the first pack case more rapidly.

The volume of the cavity between the exterior surface of the first pack case and the interior surface of the second pack case may be about 0.1% to about 10% of the volume of the second pack case. When the volume of the cavity between the exterior surface of the first pack case and the interior surface of the second pack case is less than about 0.1% of the volume of the second pack case, a sufficient amount of the fire extinguishing agent cannot be filled due to the small volume of the cavity and thus, the desired temperature reduction may not be achieved. On the contrary, when the volume of the cavity between the exterior surface of the first pack case and the interior surface of the second pack case is greater than about 10% of the volume of the second pack case, an excessive increase in the overall size of the battery pack or a reduction in the capacity of the battery pack in a limited space may occur due to the unduly large volume of the cavity.

The first venting portion may be configured to open when the temperature of the battery pack is greater than a range of about 80 to 100 degrees Celsius. Accordingly, at a temperature where the first venting portion opens, the fire extinguishing agent perfluoroketone disposed in the cavity between the exterior surface of the first pack case and the interior surface of the second pack case is in a vaporized state and thus may flow into the interior of the first pack case through the open first venting portion more rapidly. When the first venting portion opens when the temperature of the battery pack is less than about 80 degrees Celsius, the fire extinguishing agent may flow into the first pack case even in a normal operation state of the battery pack and may reduce the performance of the battery pack. On the contrary, when the first venting portion opens when the temperature of the battery pack is greater than about 100 degrees Celsius, the effect of the rapid temperature reduction of the battery pack by the fire extinguishing agent flowing into the first pack case through the open first venting portion may not be exerted in an abnormal operation state of the battery pack.

The cap assembly may be provided with a second venting portion configured to open to discharge the gas within the first pack case when the pressure in the interior of the first pack case is equal to or greater than a critical pressure. Generally, in an abnormal operation state of a battery pack, gas may be generated due to the reaction between an electrolyte and an electrode and the gas may be a factor that increases the pressure within the interior of the sealed pack case. The cap assembly may include a second venting portion configured open to discharge the gas within the first pack case when the pressure within the interior of the first pack case is equal to or greater than a critical pressure. Thus, the gas within the interior of the first pack case may be discharged to the exterior through the open second venting portion. Additionally, a fire extinguishing agent may simultaneously flow into the first pack case through the first venting portion to reduce the internal temperature and pressure of the battery pack. For example, the second venting portion may be configured to be isolated from the cavity between the exterior surface of the first pack case and the interior surface of the second pack case.

Accordingly, the fire extinguishing agent filled in the cavity between the exterior surface of the first pack case and the interior surface of the second pack case may flow into the interior of the first pack case through the first venting portion and not through the second venting portion. The gas within the interior may be discharged through the second venting portion to allow the gas discharge and the inflow of a fire extinguishing agent to be more smoothly performed without interference with each other. In other words, the temperature and pressure of the battery pack may be reduced.

In an exemplary embodiment, the first pack case may be configured to be spaced apart from the interior surface of the second pack case, at the exterior surface portion thereof excluding one surface at which the cap assembly may be coupled. In other words, the cavity between the exterior surface of the first pack case and the interior surface of the second pack case may be uniformly formed in portions other than the surface coupled to the cap assembly and the fire extinguishing agent filled in the cavity may be dispersed throughout the exterior surface of the first pack case. Accordingly, when the fire extinguishing agent is not introduced through the first venting portion, a uniform cooling effect may be obtained on the exterior surface of the first pack case. When an exterior surface portion, other than the first venting portion of the first pack case opens in an abnormal operation state of the battery pack, the fire extinguishing agent may be more easily introduced through the open portion.

In another exemplary embodiment, the first pack case may be spaced apart from the interior surface of the second pack case, at the exterior surface portion thereof opposite to a surface that the cap assembly is coupled thereto. Accordingly, the cavity that include the fire extinguishing agent may be positioned opposite to the second venting portion formed in the cap assembly and the first venting portion through which the fire extinguishing agent filled in the cavity flows may also be positioned opposite to the second venting portion. In particular, when the first venting portion and the second venting portion are formed on the exterior surface portions of the first pack case facing each other, when the fire extinguishing agent is introduced through the first venting portion and the gas within the interior is discharged through the second venting portion when the pressure inside the first pack case is equal to or greater than a critical pressure, the gas and the fire extinguishing agent may be discharged and introduced in the same direction. Moreover, the circulation of the gas and the fire extinguishing agent may be performed more rapidly without a separate circulating device and may reduce the temperature and pressure within the interior more rapidly.

The first venting portion may have a slit structure formed on an exterior surface portion of the first pack case. Therefore, the slit structure may be formed in a groove shape having a reduced thickness when compared with the other portions of the first pack case. When the pressure within the interior of the first pack case is equal to or greater than a critical pressure, the exterior surface portion of the first pack case corresponding to the cavity filled with the fire extinguishing agent may be configured to open preferentially over the other exterior surface portion and may be configured to enable the fire extinguishing agent to flow into the first pack case.

For example, the slit may have a discontinuous curve structure. Accordingly, in the first venting portion having the slit structure, a portion having the curve structure may be configured to open when the discontinuous portion is connected to the exterior surface of the first pack case. This may provide for improved adjustment of the opening direction of the first venting portion and may configure the first venting portion to open in a desired direction, for example, in the direction of the cavity between the exterior surface of the first pack case filled with the fire extinguishing agent and the interior surface of the second pack case.

In an exemplary embodiment, the first pack case and the second pack case may have a structure formed from a metal in a cylindrical shape. More specifically, in order to protect the electrode assembly disposed therein against vibrations and impacts from the external environment, and prevent explosion of the battery pack due to a high temperature and a high pressure generated therein, the first pack case and the second pack case may be formed of a material that has a predetermined rigidity (e.g., a metal cylinder) given the above characteristics. However, the material of the first pack case and the second pack case is not limited thereto. The material is not particularly limited as long provided the material has a predetermined rigidity to obtain the effects and may provide improved handling and shape. Further, the first pack case and the second pack case may have the same or different shapes from each other.

Therefore, when the first pack case and the second pack case have the same shape, the utilization efficiency of the interior cavity may be maximized. On the contrary, when the first pack case and the second pack case have different shapes from each other, the restriction on the mounting space of the battery pack in devices may be minimized since the second pack case of various shapes may be coupled to one type of the first pack case. For example, the shape and structure of the first pack case and the second pack case are not particularly limited. Specifically, the first and second pack cases may have a shape or structure which may prevent local damage to the pack cases resulting from the concentration of high temperature and high pressure within the interior of the pack cases, and may be applied to a mounting space of various devices. More specifically, the first pack case and the second pack case each may have a cylindrical structure or a hexahedral structure.

Additionally, the present disclosure provides a battery pack case that may include the battery pack. The battery pack case includes a battery pack case with an electrode assembly having a cathode, an anode and a separator interposed therebetween disposed therein and may include a first pack case having the electrode assembly together with an electrolyte disposed therein, a second pack case having the first pack case disposed therein and at least a portion of the interior surface thereof may be spaced apart from the exterior surface of the first pack case to allow a fire extinguishing agent to be disposed in the cavity between the first pack case and the second pack case and a cap assembly may be coupled to simultaneously seal one open surface of the first pack case and of the second pack case when the first pack case containing the electrode assembly and the electrolyte and the fire extinguishing agent are contained and filled in the second pack case. Further, a first venting portion may be configured to open to allow the fire extinguishing agent disposed in the cavity to flow into the interior of the first pack case when the pressure within the interior of the first pack case is equal to or greater than a critical pressure, is formed on the exterior surface of the first pack case in the cavity between the exterior surface of the first pack case and the interior surface of the second pack case.

For example, the fire extinguishing agent may be a liquid perfluoroketone which vaporizes at a fixed temperature. The volume of the cavity between the exterior surface of the first pack case and the interior surface of the second pack case may be about 0.1% to about 10% of the volume of the second pack case. The first venting portion may be configured to open when the temperature of the battery pack is greater than a range of about 80 to 100 degrees Celsius. The structures of the battery pack and the battery pack case other than the aforementioned configuration and structure are well known in the art, and thus a detailed description thereof will be omitted herein.

Hereinafter, embodiments of the present disclosure will be described with reference to the accompanying drawings. However, the scope of the present disclosure is not limited thereto. FIG. 1 is an exemplary schematic view showing the structure of a battery pack according to an exemplary embodiment of the present disclosure. With reference to FIG. 1, the battery pack 100 may include a structure having an electrode assembly 101 disposed in a battery pack case 102. The battery pack case 102 may include a first pack case 110 a second pack case 120 and a cap assembly 130. The first pack case 110 and the second pack case 120 may have a cylindrical structure that corresponds to the exterior shape of the electrode assembly 101 and the first pack case 110 may be relatively small in size as compared with the second pack case 120. Accordingly, the first pack case 110 may be disposed in the second pack case 120 when the electrode assembly 101 and an electrolyte are contained therein.

The exterior surface portion of the first pack case 110 excluding the upper surface that has the cap assembly 130 coupled thereto, may be spaced apart from the interior surface of the second pack case 120 to form a cavity. A fire extinguishing agent may be disposed in the cavity. A first venting portion 111 may be configured to open to allow the fire extinguishing agent filled in the cavity to flow into the first pack case 110 when the internal pressure is equal to or greater than a critical pressure, is may be formed on the lower surface of the first pack case 110.

The cap assembly 130 may be simultaneously coupled to the upper surfaces of the first pack case 110 and of the second pack case 120 when the electrode assembly 101 together with an electrolyte is disposed in the first pack case 110 thereby sealing the first pack case 110 and the second pack case 120. The cap assembly 130 may include a second venting portion 131 that may be configured to open to discharge the gas within the interior of the first pack case 110 to the exterior when the internal pressure of the first pack case 110 is equal to or greater than a critical pressure.

Accordingly, the second venting portion 131 may be isolated from the cavity between the exterior surface of the first pack case 110 and the interior surface of the second pack case 120. When the internal pressure of the first pack case 110 exceeds a critical pressure, the first venting portion 111 and the second venting portion 131 may be configured to open simultaneously to enable the fire extinguishing agent in a vaporized state to flow into the first pack case 110 through the first venting portion 111. Simultaneously, the gas within the interior of the first pack case may be discharged to the exterior through the second venting portion 131, which may enable the temperature and pressure in the battery pack 100 to be reduced.

Figure 2:
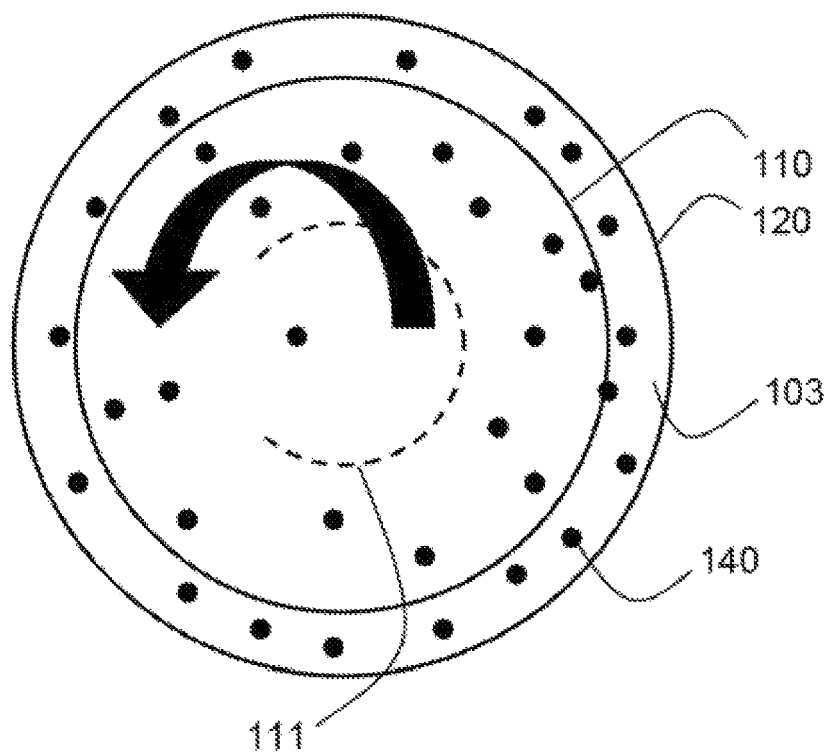
FIG. 2 is an exemplary schematic view showing a cross-sectional structure of the battery pack of FIG. 1 as viewed from the bottom according to an exemplary embodiment of the present disclosure.

FIG. 2 is an exemplary schematic view showing a cross-sectional structure of the battery pack of FIG. 1 as viewed from the bottom. With reference to FIG. 2, the first venting portion 111 formed on the lower surface of the first pack case 110 may include a slit structure that may have a curved surface structure discontinuous at the left side in a plan view. Therefore, when the internal pressure of the first venting portion 111 is equal to or greater than a critical pressure, the right side of the first venting portion 111 may be configured to open when the discontinuous left side is connected to the lower surface of the first pack case 110. Then, the fire extinguishing agent 140 disposed in the cavity 103 between the exterior surface of the first pack case 110 and the interior surface of the second pack case 120 may be configured to flow into the interior of the first pack case 110 through the open first venting portion 111 and performs extinguishment, thereby reducing the temperature and pressure within the interior of the battery pack.

Figure 3:
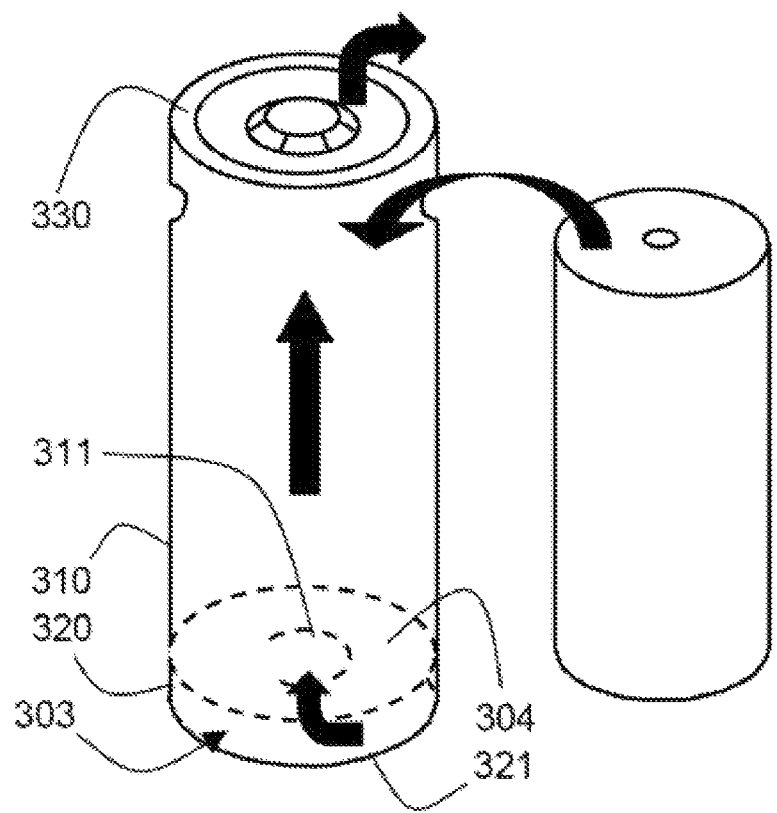
FIG. 3 and FIG. 4 are exemplary schematic views showing the structure of a battery pack according to an exemplary embodiment of the present disclosure.
Figure 4:
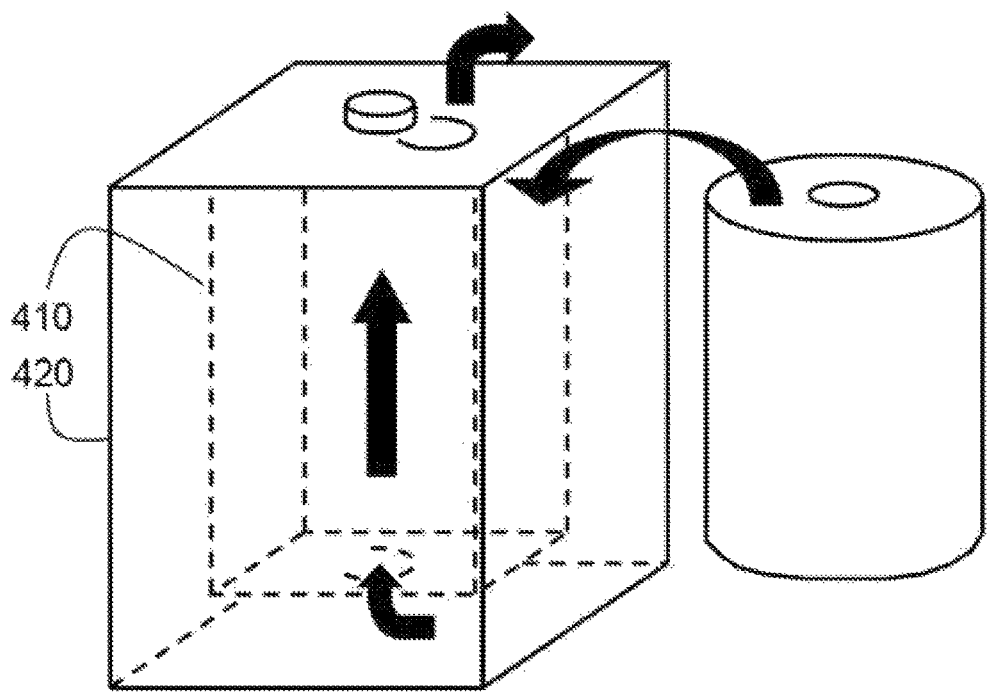

FIG. 3 and FIG. 4 are exemplary schematic views showing the structure of a battery pack according to an exemplary embodiment of the present disclosure. With reference to FIG. 3, the first pack case 310 and the second pack case 320 may be separated from each other by a partition wall 304 disposed apart from the lower surface 321 of the second pack case 320 at a position opposite to the cap assembly 330. In particular, the partition wall 304 may include the lower surface of the first pack case 310. Additionally, a cavity 303 in which a fire extinguishing agent is disposed may be formed between the partition wall 304 and the lower surface 321 of the second pack case 320 at a position opposite to the cap assembly 330. The partition wall 304 may include a first venting part 311 configured to open to allow the fire extinguishing agent to be disposed in the cavity 303 to flow into the first pack case 310 when the internal pressure of the first pack case 310 is equal to or greater than a critical pressure.

The structure of the battery pack is the same as that of the battery pack of FIG. 1, except the above structure, and thus a detailed description thereof will be omitted. With reference to FIG. 4, the first pack case 410 and the second pack case 420 may have the same shape of a hexahedral structure. The structure of the battery pack may be the same as that of the battery pack of FIG. 1, except the above structure, and thus a detailed description thereof will be omitted.

Figure 5:
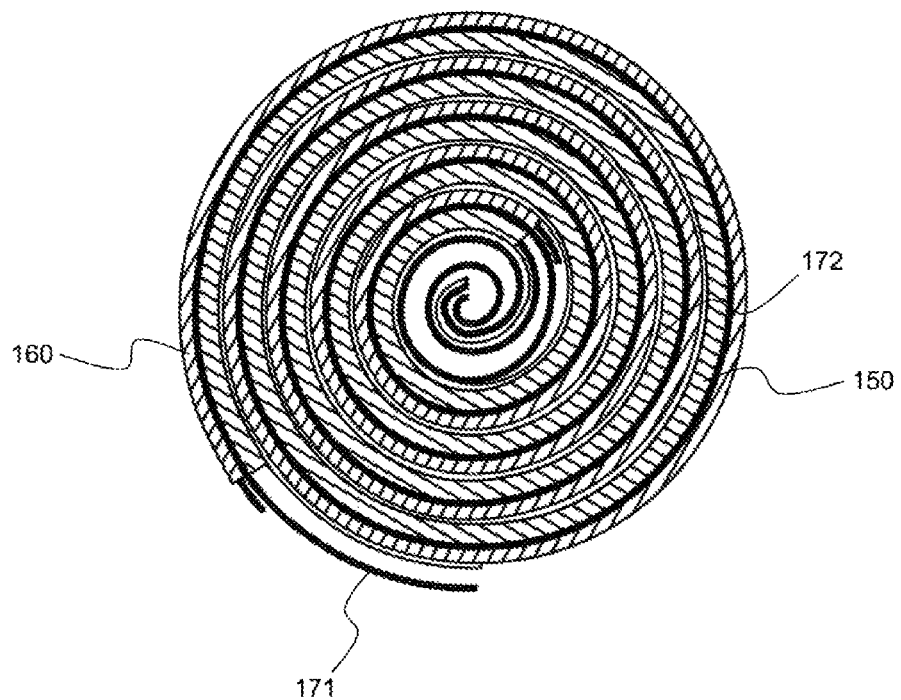
FIG. 5 is an exemplary top view of the layered spiral arrangement electrode assembly of FIG. 1 according to an exemplary embodiment of the present disclosure.

One of typical example of the electrode assembly 101 is shown in FIG. 5. The electrode assembly 101 may include a cathode 150, an anode 160, and separators 171, 172 interposed therebetween. The electrode assembly 101 in FIG. 5. is a layered spiral type arrangement (e.g., jelly-roll type electrode assembly).

As described above, the battery pack according to the present disclosure may be configured such that, when the pressure within the interior of the first pack case is equal to or greater than a critical pressure, a first venting portion formed in the first pack case may be configured to open to enable a fire extinguishing agent disposed in a cavity between the exterior surface of the first pack case and the interior surface of the second pack case to flow into the interior of the first pack case. Accordingly the fire extinguishing agent may directly contact the electrode assembly within the interior of the battery to reduce the temperature of the battery pack. Thus, the battery pack may more effectively prevent the risk of ignition or explosion due to an increase in the internal temperature and pressure occurring under an abnormal operation state of the battery pack and may thereby enhance the safety. Additionally, the battery pack may provide superior safety when compared to conventional battery packs that use a safety vent to reduce the internal temperature and pressure.

While the disclosure has been described with reference to the drawings according to the exemplary embodiments thereof, it will be apparent to those skilled in the art that various changes and modifications may be made based on the descriptions given herein without departing from the scope of the disclosure.

What is claimed is:

1. A battery pack comprising:
an electrode assembly having a cathode, an anode, and a separator interposed therebetween;
a first pack case with the electrode assembly and an electrolyte disposed therein, the first pack case having a first open end defining a first opening;
a second pack case surrounding the first pack case such that the first pack case is disposed within the second pack case and a portion of an interior surface of the second pack case is spaced apart from an exterior surface of the first pack case, so as to define a cavity between the exterior surface of the first pack case and the interior surface of the second pack case, the cavity extending to a second opening at a second open end of the second pack case, the second open end having an annular shape positioned about the first open end;
a fire extinguishing agent disposed throughout the cavity;
a cap assembly coupled to the first and second pack cases to simultaneously seal the first opening of the first pack case and the second opening of the second pack case, so as to seal the electrode assembly and the electrolyte within the first pack case and seal the fire extinguishing agent within the second pack case; and
a first venting portion formed on the exterior surface of the first pack case as a groove having a thickness less than a thickness of other portions of the first pack case,
wherein the first venting portion is configured to open to enable the fire extinguishing agent disposed throughout the cavity to flow into an interior of the first pack case when a pressure within the first pack case is equal to or greater than a critical pressure.

2. The battery pack according to claim 1, wherein the fire extinguishing agent is a liquid perfluoroketone which vaporizes at a fixed temperature.

3. The battery pack according to claim 1, wherein the volume of the cavity between the exterior surface of the first pack case and the interior surface of the second pack case is about 0.1% to about 10% of the volume of the second pack case.

4. The battery pack according to claim 1, wherein the first venting portion is configured to open when the temperature of the battery pack is equal to or greater than a range of about 80 to about 100 degrees Celsius.

5. The battery pack according to claim 1, wherein the cap assembly includes a second venting portion, configured to open to discharge the gas disposed within the first pack case when the pressure within the first pack case is equal to or greater than a critical pressure.

6. The battery pack according to claim 5, wherein the second venting portion is isolated from the cavity between the exterior surface of the first pack case and the interior surface of the second pack case.

7. The battery pack according to claim 1, wherein the first venting portion has a slit structure formed on an exterior surface portion of the first pack case.

8. The battery pack according to claim 7, wherein the slit structure has a discontinuous curve structure.

9. The battery pack according to claim 1, wherein the first pack case and the second pack case are formed from a metal in a cylindrical shape.

10. The battery pack according to claim 1, wherein the first pack case and the second pack case have similar shapes to one another.

11. The battery pack according to claim 10, wherein the first pack case and the second pack case each have a cylindrical shape or a hexahedral shape.

12. A battery pack case for accommodating an electrode assembly having a cathode, an anode and a separator interposed therebetween, comprising:
a first pack case with the electrode assembly and an electrolyte disposed therein, the first pack case having a first open end defining a first opening;
a second pack case receiving the first pack case within the second pack case such that at least a portion of an interior surface of the second pack case surrounds and is spaced apart from an exterior surface of the first pack case, so as to define a cavity between the first pack case and the second pack case, the cavity extending to a second opening at a second open end of the second pack case, the second open end having an annular shape positioned about the first open end, the cavity receiving a fire extinguishing agent disposed throughout the cavity up to the second open end;
a cap assembly coupled to the first and second pack cases to simultaneously seal the first opening of the first pack case and the second opening of the second pack case, so as to seal the electrode assembly and the electrolyte within the first pack case and seal the fire extinguishing agent within the second pack case; and
a first venting portion formed on the exterior surface of the first pack case as a groove having a thickness less than a thickness of other portions of the first pack case,
wherein the first venting portion is configured to open to enable the fire extinguishing agent disposed throughout the cavity to flow into an interior of the first pack case when a pressure within the first pack case is equal to or greater than a critical pressure.

13. The battery pack case according to claim 12, wherein the fire extinguishing agent is a liquid perfluoroketone which vaporizes at a fixed temperature.

14. The battery pack case according to claim 12, wherein the volume of the cavity between the exterior surface of the first pack case and the interior surface of the second pack case is about 0.1% to about 10% of the volume of the second pack case.

15. The battery pack case according to claim 12, wherein the first venting portion opens when the temperature of the battery pack is equal to or greater than a range of about 80 to about 100 degrees Celsius.

16. A battery pack case for accommodating an electrode assembly having a cathode, an anode, and a separator interposed therebetween, the battery pack case comprising:
- a first pack case with the electrode assembly and an electrolyte disposed therein, the first pack case having a first open end defining a first opening;
- a second pack case receiving the first pack case within the second pack case such that at least a portion of an interior surface of the second pack case surrounds and is spaced apart from an exterior surface of the first pack case, so as to define a cavity between the exterior surface of the first pack case and the interior surface of the second pack case, the cavity extending to a second opening at a second open end of the second pack case, the second open end having an annular shape positioned about the first open end;
- a fire extinguishing agent disposed throughout the cavity;
- a cap assembly coupled to the first and second pack cases to simultaneously seal the first opening of the first pack case and the second opening of the second pack case, so as to seal the electrode assembly and the electrolyte within the first pack case and seal the fire extinguishing agent within the second pack case;
- a first venting portion formed on the exterior surface of the first pack case as a groove having a thickness less than a thickness of other portions of the first pack case; and
- a second venting portion formed in a portion of the cap assembly that seals the opening of the first pack case,
- wherein, when a pressure within the first pack case is equal to or greater than a critical pressure, the first venting portion and the second venting portion are configured to open to enable a gas within an interior of the first pack case to be discharged to an exterior of the battery pack case via the second venting portion and to enable the fire extinguishing agent within the cavity to flow into the interior of the first pack case via the first venting portion.

17. The battery pack according to claim 1, wherein the first pack case and the second pack case have different shapes from one another.

* * * * *